United States Patent [19]

Best

[11] 4,249,754
[45] Feb. 10, 1981

[54] MOTOR-VEHICLE REAR-SEAT HEAD RESTRAINT

[76] Inventor: Carl M. Best, Steinhalde 69, 7800 Freiburg-Ebnet, Fed. Rep. of Germany

[21] Appl. No.: 970,143

[22] Filed: Dec. 18, 1978

[30] Foreign Application Priority Data

Dec. 22, 1977 [DE] Fed. Rep. of Germany ....... 2757188

[51] Int. Cl.³ ............................................. B60R 21/02
[52] U.S. Cl. ..................................... 280/751; 297/395
[58] Field of Search ........................ 280/751, 748, 749; 296/84 K; 297/395

[56] References Cited

U.S. PATENT DOCUMENTS

| 2,649,142 | 8/1953 | New ...................................... 297/395 |
| 3,964,788 | 6/1976 | Kmetyko ............................. 297/395 |

FOREIGN PATENT DOCUMENTS

| 1680142 | 7/1971 | Fed. Rep. of Germany . |
| 1780244 | 12/1971 | Fed. Rep. of Germany ........... 280/748 |
| 2138151 | 2/1973 | Fed. Rep. of Germany . |

Primary Examiner—John J. Love
Assistant Examiner—Milton L. Smith
Attorney, Agent, or Firm—Karl F. Ross

[57] ABSTRACT

A head restraint for the rear seat of a motor vehicle has a cushion positionable along a frame that is pivoted on the roof of the vehicle for movement between a storage position with the cushion out of the way against the roof of the vehicle and a use position with the cushion at the level of the head of a person sitting in the rear seat of the vehicle. In the use position the lower end of the frame engages an abutment on the seat back or on the rear-window shelf. One such head restraint is provided at each sitting location along the seat.

6 Claims, 2 Drawing Figures

MOTOR-VEHICLE REAR-SEAT HEAD RESTRAINT

FIELD OF THE INVENTION

The present invention relates to a motor-vehicle head restraint. More particularly this invention concerns such a head restraint usable in the rear seat of a passenger vehicle.

BACKGROUND OF THE INVENTION

It is standard practice to provide the front seat of an automobile at each sitting position with a head restraint, normally constituted as an upward extension of the seat, or a bar or guide carrying a cushion at the level of the head of a person sitting in the seat. The purpose of such a head restraint is to prevent a passenger's or driver's head from being snapped back excessively in the event of a rear-end collision. In addition to this protection against whiplash injury, such a head restraint is often regarded as a desirable amenity, as it allows the person using the seat to lean his or her head back for sleeping or resting.

It has been suggested to provide such head restraints for the rear-seat passengers in a passenger vehicle. The basic requirements of such a rear-seat head restraint are that it act as well in preventing whiplash as the standard front-seat head restraints, and at the same time not block the driver's view through the rear vehicle window.

Accordingly it has been suggested in German Patent publication No. 1,608,142 to provide a tough and slightly elastic net across the passenger compartment and immediately behind and above the rear seat. Although this system has the advantage of offering little obstruction to rearward view, it nonetheless offers only minimal protection against whiplash injury, as the net is normally not sufficiently strong to withstand a strong backward force.

It has also been suggested in German Patent publication No. 2,138,151 to provide a heavy strap which extends at head level across the back of the vehicle above the rear seat back. Although such a system has the advantage of considerable simplicity, it nonetheless presents an obstruction to view, and also offers a normally inadequate protection for the rear seat passengers. To eliminate the obstruction when no passengers are in the rear seat it is a relatively simple matter to unhook this head-restraint strap, however such unhooking is a normally bothersome operation, as is rehooking it when the rear seat is to be used by a passenger.

OBJECTS OF THE INVENTION

It is therefore an object of the present invention to provide an improved head restraint.

Another object is to provide such a head restraint which is particularly usable for the rear seat of an automotive vehicle, although entirely usable for another seat if desired.

A further object is to provide such a head restraint which is relatively substantial so that it can withstand considerable rearwardly directed force, yet which nonetheless either offers little obstruction to view or can be readily removed from the line of view.

SUMMARY OF THE INVENTION

These objects are attained according to this invention in a head restraint having a head-restraining body and means mounting this body on the roof of the vehicle for displacement between a use position fixed above the seat back and engageable by the head of the person sitting against the seat back and a storage position immediately adjacent the roof and unengageable by the head of a person sitting against the seat back. Thus it is possible to move the body, normally a cushion, up into the storage position when no one is using the back seat so as to give a completely free field of view through the rear window.

According to this invention the body is constituted as described above of a cushion and a frame. The mounting means is a pivot extending horizontally and perpendicular to the direction of the motion of the vehicle immediately below the roof. This pivot, or the seat back or shelf immediately behind the body is formed with an abutment against which the frame element of the body lies when in the use position. Thus a passenger need merely swing the head restraint down against the abutment to provide an extremely rigid head restraint. When no one is using the particular sitting position the cushion can be swung up against the roof, where it is out of the way completely.

In accordance with another feature of this invention the cushion is displaceable along the frame. Thus it is possible to displace and block the cushion at any location on its frame so that each user can readily set the exact height desired.

With the system according to the instant invention it is therefore possible to provide a very solid head restraint. Displacing of this head restraint completely out of the way is relatively easy, yet even when in use the head restraint will offer little more obstruction to rearward view than does the head of the person in front of it. In a vehicle having only two sitting positions in the rear seat the view rearward by means of the rear view mirror will therefore be between the two head restraints, assuming both are in use.

SPECIFIC DESCRIPTION

Figure 1:
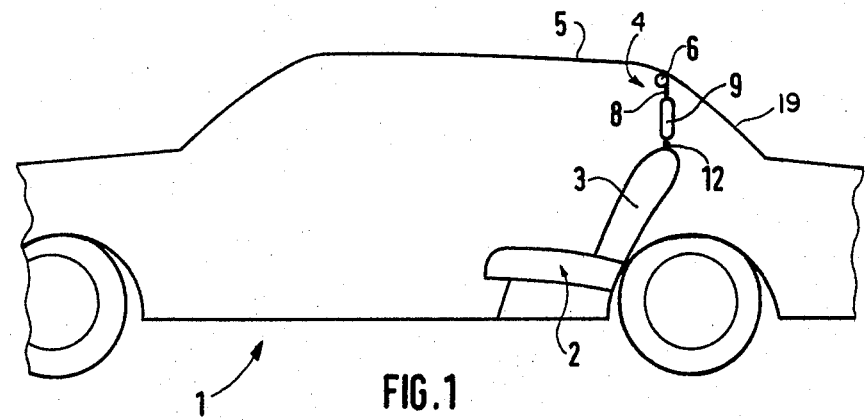
FIG. 1 is a largely schematic view illustrating a vehicle having a head restraint according to this invention.

As shown in FIG. 1 a passenger vehicle 1 has a rear seat 2 with a seat 3, at roof 5, a rear window 19, and a rear-seat head restraint 4.

Figure 2:
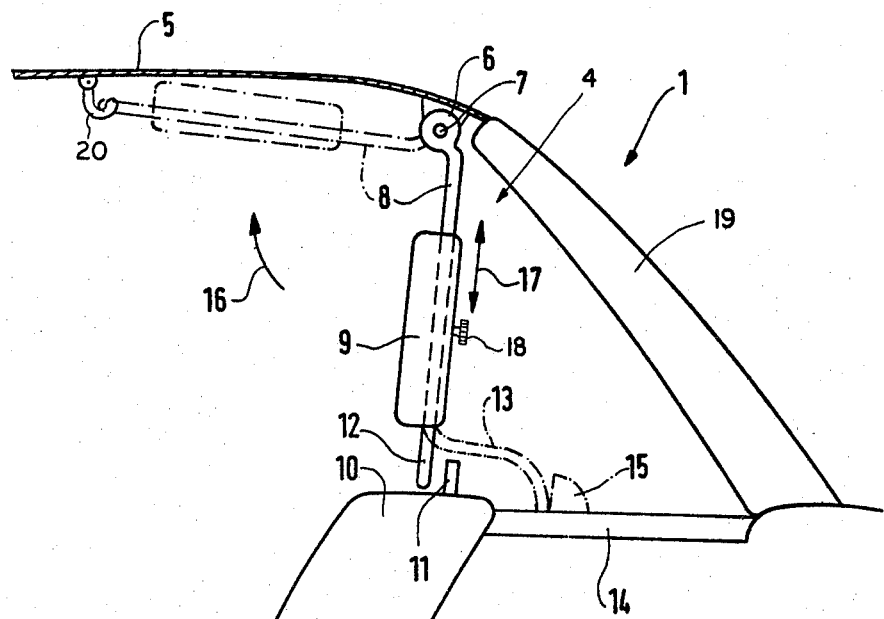
FIG. 2 is a large-scale view of the detail of FIG. 1.

As shown in more detail in FIG. 2 the rear-seat head restraint 4 basically comprises a cushion 9 mounted on a frame 8 pivotal about an axle 7 fixed to the roof 5 by means of lugs 6 and extending horizontally and perpendicular to the normal direction of travel of the vehicle 1. This cushion 9 can slide along the frame 8 as shown by double-headed arrow 17 and can be secured at any location therealong by means of a screw 18.

The frame 8 is therefore pivotal with the cushion 9 as shown by arrow 16 about the axle 7. When in the storage position, shown in dot-dash lines in FIG. 2, it can be held in place by means of hook or latch 20 mounted on the motor-vehicle roof 5.

When in the solid-line use position the frame 8 has a lower end 12 that engages backwardly against an abutment 11 mounted on the upper edge 10 of the seat back 3. Thus the frame 8 with the cushion 9 can pivot through approximately 90° between its two end positions. It is also possible to provide interengaging formations at the pivot 6, 7 to define the use position.

FIG. 2 also shows how the lower end 12 can be bent back as shown at 13 to engage an abutment 15 provided on the rear-window shelf 14 immediately below the rear window 19. It is also, of course, possible to provide on the seat back 3 or shelf 14 a latching arrangement such as the latch 20 to hold the head restraint in the illustrated use position.

I claim:

1. In combination with a vehicle having a rear seat having a seat back spaced below the vehicle roof and in front of a rear window, a head restraint comprising:
    a pivot having a horizontal pivot axis adjacent and fixed relative to said roof above said rear seat;
    a forwardly directed abutment fixed in said vehicle below said roof and adjacent said seat back;
    a body; and
    means mounting said body on said roof at said pivot for pivotal displacement between an upright use position bearing backwardly against said abutment, fixed above said seat back, and engageable by the head of a person sitting against said seat back, and a generally horizontal storage position immediately adjacent said roof and unengageable by the head of a person sitting against said seat back.

2. The restraint defined in claim 1 wherein said body includes a rigid frame element connected to said pivot and engageable with said abutment, and a cushion carried on said element.

3. The restraint defined in claim 2 wherein said cushion is slidable along said element vertically in said use position, said restraint further comprising means for securing said cushion at any of a plurality of locations along said element.

4. The restraint defined in claim 2 wherein said abutment is engageable with said element and is provided directly on said seat back.

5. The restraint defined in claim 2 wherein said vehicle has a rear-window shelf behind said seat back, said abutment being engageable with said element and being provided on said shelf.

6. The restraint defined in claim 2 wherein said seat back defines several rear-sitting positions spaced along said axis, one such body, abutment, and mounting means being provided at each such position.

* * * * *